United States Patent
Kuo et al.

(10) Patent No.: US 10,013,743 B2
(45) Date of Patent: Jul. 3, 2018

(54) SYSTEMS, METHODS AND DEVICES FOR PERFORMING MOTION ARTIFACT CORRECTION

(71) Applicant: THE ARIZONA BOARD OF REGENTS ON BEHALF OF THE UNIVERSITY OF ARIZONA, Tucson, AZ (US)

(72) Inventors: Phillip H. Kuo, Tucson, AZ (US); Bijan Najafi, Tucson, AZ (US); Matthew A. Kupinski, Tucson, AZ (US)

(73) Assignee: THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 15/308,310

(22) PCT Filed: Apr. 30, 2015

(86) PCT No.: PCT/US2015/028548
§ 371 (c)(1),
(2) Date: Nov. 1, 2016

(87) PCT Pub. No.: WO2015/168424
PCT Pub. Date: Nov. 5, 2015

(65) Prior Publication Data
US 2017/0061589 A1   Mar. 2, 2017

Related U.S. Application Data

(60) Provisional application No. 61/987,178, filed on May 1, 2014.

(51) Int. Cl.
*G06K 9/40*    (2006.01)
*G06T 5/00*    (2006.01)
*G06T 5/50*    (2006.01)

(52) U.S. Cl.
CPC .............. *G06T 5/005* (2013.01); *G06T 5/002* (2013.01); *G06T 5/50* (2013.01); *G06T 2200/04* (2013.01); *G06T 2207/10104* (2013.01); *G06T 2207/10108* (2013.01); *G06T 2207/20182* (2013.01); *G06T 2207/30016* (2013.01); *G06T 2207/30061* (2013.01)

(58) Field of Classification Search
CPC ................. G06T 7/20; G06T 2200/04; G06T 2207/10088; G06T 2207/10104; G06T 2207/10108; G06T 2207/20182; G06T 2207/30016; G06T 2207/30061; G01T 1/2985; A61B 6/5264; A61B 6/5247; A61B 6/547
See application file for complete search history.

(56) References Cited

U.S. PATENT DOCUMENTS

| | | | |
|---|---|---|---|
| 7,365,334 B1 | 4/2008 | Gordon | |
| 8,121,361 B2 | 2/2012 | Ernst et al. | |
| 8,264,553 B2 | 9/2012 | Joshi et al. | |
| 8,862,202 B2* | 10/2014 | Alexander | A61B 5/1114 600/410 |
| 9,286,686 B2* | 3/2016 | Lang | A61B 5/055 |
| 9,538,974 B2* | 1/2017 | Cao | A61B 6/5276 |
| 2010/0266099 A1* | 10/2010 | Busch | A61N 5/1048 378/65 |
| 2015/0051489 A1* | 2/2015 | Caluser | A61B 8/0825 600/440 |

OTHER PUBLICATIONS

International Search Report, International Patent Application No. PCT/US2015/028548, dated Jul. 27, 2015.
Huang et al. Motion compensation for brain PET imaging using wireless MR active markers in simultaneous PET-MR: phantom and non-human primate studies. NeuroImage 91, pp. 129-137, May 1, 2014.

* cited by examiner

*Primary Examiner* — Ali Bayat
(74) *Attorney, Agent, or Firm* — Casimir Jones, S.C.

(57) ABSTRACT

The present invention provides methods and devices for correcting motion related imaging artifacts. In particular, the methods include positioning a device configured to detect motion at a region of interest on an object, simultaneously obtaining an image data set of the region of interest and a motion data set at the region of interest with the device, and correcting motion related imaging artifacts with an algorithm configured to identify time periods of motion from the motion data set, and correct the image data set corresponding to the identified time periods of motion.

20 Claims, No Drawings

SYSTEMS, METHODS AND DEVICES FOR PERFORMING MOTION ARTIFACT CORRECTION

CROSS-REFERENCE TO RELATED APPLICATIONS

The present application is a U.S. 371 national phase entry of International Patent Application No. PCT/US2015/028548, filed Apr. 30, 2015, which claims priority to U.S. Provisional Patent Application No. 61/987,178, filed May 1, 2014, the contents of which are incorporated by reference in their entireties.

STATEMENT REGARDING FEDERALLY SPONSORED RESEARCH OR DEVELOPMENT

This invention was made with government support under R25 EB012973 awarded by the NIH. The government has certain rights in the invention.

FIELD OF THE INVENTION

The present invention relates to motion compensation in imaging, and especially to motion compensation in nuclear imaging modalities such as positron emission tomography (PET) and single photon emission computed tomography (SPECT), and the like. The systems, methods and devices of the present invention find particular application to medical and other applications where it is desirable to correct for motion in an object under examination.

BACKGROUND

Multi-modality imaging systems exist that scan using different modalities, for example, Positron Emission Tomography (PET), Single Photon Emission Computed Tomography (SPECT), PET/CT, SPECT/CT, and PET/MRI (magnetic resonance imaging). During operation, such conventional imaging systems may exhibit image quality that is affected by motion of the object being imaged. For example, PET imaging of the lung and abdomen region is generally affected by patient respiratory motion. The respiratory motion may cause an underestimation, for example, of tumor uptake and an overestimation of tumor volume. Moreover, imaging of a brain region or respiratory region (e.g., with PET or SPECT) may suffer from image related artifacts that are undetectable and compromise a health professionals interpretation of such imaging.

The present invention addresses such problems.

SUMMARY

In certain embodiments, the present invention provides methods for correcting a motion related imaging artifact within an image, comprising providing 1) a motion detection device configured generate a motion data set of motion at a region of interest for an object, wherein the motion data set comprises x, y and z coordinate information pertaining to the region of interest for the object, and 2) an algorithm configured to a) receive a simultaneously obtained motion data set and image data set for a region of interest of an object, wherein the image data sets are obtained with PET or SPECT imaging, b) identify any time periods of motion from the motion data set, c) detect a motion related imaging artifact within the image data set through detecting differences between the x, y and z coordinates for the image data set and the motion data set for the identified time periods of motion, d) correcting the detected motion related imaging artifact through spatially correcting the detected x, y and z coordinate differences for identified time periods of motion, and positioning the motion detection device at a region of interest on an object, simultaneously obtaining an image data set of the region of interest with PET or SPECT and a motion data set of the region of interest with the motion detecting device, inputting the simultaneously obtained image data set and motion data set in the algorithm, and correcting any detected motion related imaging artifacts with the algorithm.

In some embodiments, the methods further comprising the following post correcting step: generating a reconstructed image.

In some embodiments, the object is a subject (e.g., a mammalian subject) (e.g., a human subject) (e.g., a living human subject).

In some embodiments, the region of interest is a portion of the subject (e.g., an anatomical portion of a human subject (e.g., brain region, heart region, lung region)).

In some embodiments, the motion detection device comprises one or more motion detection sensors. In some embodiments, the one or more motion detection sensors include one or more gyroscopes and/or accelerometers. In some embodiments, the motion detection device is configured to be securely positioned onto and/or around the region of interest for the object.

In some embodiments, the motion data set comprising x, y and z coordinate information pertaining to the region of interest for the object comprises one or more of degree of motion within the x, y and z coordinates, rate of the motion within the x, y and z coordinates, and length of time for the detected and recorded motion within the x, y and z coordinates. In some embodiments, the degree of motion within the x, y and z coordinates comprises detecting at least 0.015 radians of motion. In some embodiments, the rate of the motion within the x, y and z coordinates comprises detecting rates of motion greater than at least 25 Hz.

In certain embodiments, such methods are used for imaging a desired anatomical region within a subject at risk for detectable motion (e.g., for any medically related purpose).

In certain embodiments, the present invention provides systems for correcting a motion related imaging artifact within an image, comprising providing 1) a motion detection device configured generate a motion data set of motion at a region of interest for an object, wherein the motion data set comprises x, y and z coordinate information pertaining to the region of interest for the object, and 2) an algorithm configured to a) receive a simultaneously obtained motion data set and image data set for a region of interest of an object, wherein the image data sets are obtained with PET or SPECT imaging, b) identify any time periods of motion from the motion data set, c) detect a motion related imaging artifact within the image data set through detecting differences between the x, y and z coordinates for the image data set and the motion data set for the identified time periods of motion, and d) correcting the detected motion related imaging artifact through spatially correcting the detected x, y and z coordinate differences for identified time periods of motion.

In some embodiments, the motion data set comprising x, y and z coordinate information pertaining to the region of interest for the object comprises one or more of degree of motion within the x, y and z coordinates, rate of the motion within the x, y and z coordinates, and length of time for the detected and recorded motion within the x, y and z coordinates. In some embodiments, the degree of motion within the x, y and z coordinates comprises detecting at least 0.015 radians of motion. In some embodiments, the rate of the motion within the x, y and z coordinates comprises detecting rates of motion greater than at least 25 Hz.

In some embodiments, the systems further comprise the items necessary to conduct PET or SPECT imaging. In some embodiments, the systems further comprise a processor for running the algorithm.

DETAILED DESCRIPTION

The present invention provides systems, methods and devices for correcting motion related imaging artifacts related to nuclear imaging (e.g., blurring within an obtained image resulting from motion of the imaged body region, streaking within an obtained image resulting from motion of the imaged body region, discontinuities within an obtained image resulting from motion of the imaged body region). Such motion related imaging artifacts represent a significant problem within the health care industry. For example, with brain imaging of neurodegenerative diseases or movement disorders such as Parkinson's disease, patients suffer from tremors that may make remaining still through an imaging session impossible, thereby compromising the resulting images with motion related imaging artifacts. In addition, for example, Alzheimer's disease patients may have difficulty remembering or following directions to remaining still. Moreover, any patient may cough or sneeze resulting in severe head motion resulting motion related imaging artifacts.

In particular, the methods include positioning a motion detecting device configured to detect motion at a region of interest on an object, simultaneously obtaining an image data set of the region of interest and a motion data set at the region of interest with the motion detecting device, and correcting motion related imaging artifacts with an algorithm configured to identify time periods of motion from the motion data set, correct the image data set corresponding to the identified time periods of motion, and generate a reconstructed image corresponding to the identified time periods of motion through such correction of the image data set corresponding to the identified time periods of motion.

The present invention is not limited to imaging a particular region of interest. Indeed, the term "particular region of interest" contemplates any living subject or non-living object that can be imaged. The term "subject" includes animals, preferably mammals, including humans. In a preferred embodiment, the subject is a primate. In an even more preferred embodiment, the subject is a human. In some embodiments, the particular region of interest is a human subject (e.g., the whole body of a human subject) (e.g., any portion or region of a human subject (e.g., brain)).

The present invention is not limited to a particular motion detecting device configured to detect motion at a region of interest on an object (e.g., a brain region for a human subject). In some embodiments, the motion detecting device includes one or more sensors able to detect motion data within an area of interest. The sensors are not limited to measuring particular variables of motion. For example, in some embodiments, the sensors are able to detect and record motion within x, y and z coordinates, the rate of the motion within such coordinates, and the length of time for such detected and recorded motion. The sensors are not limited to measuring a particular degree of motion. In some embodiments, the sensors are configured to measure at least approximately 0.015 radians of motion (e.g., 0.005 radians of motion, 0.01 radians of motion, 0.015 radians of motion, 0.02 radians of motion, 0.025 radians of motion, 0.03 radians of motion, 0.05 radians of motion, 0.075 radians of motion, 0.01 radians of motion, and higher degrees of radians of motion). The sensors are not limited to measuring a particular rate of motion. In some embodiments, the sensors are configured to measure a rate of motion at or greater than approximately 25 Hz (e.g., 10 Hz, 15 Hz, 20 Hz, 25 Hz, 30 Hz, 31 Hz, 35 Hz, 40 Hz, 50 Hz, 60 Hz, 80 Hz, 100 Hz, and higher rates).

In some embodiments, the sensors are configured to transmit (e.g., wirelessly) such detected and recorded motion data to a processor. The devices are not to utilizing a particular number of sensors (e.g., 1, 2, 3, 4, 5, 10, 15, 20, etc.). In some embodiments, the number of sensors utilized within the motion detecting device is sufficient to measure (e.g., detect and record) one or more variables of motion (e.g., motion within x, y and z coordinates, the rate of the motion within such coordinates, and the length of time for such motion within the x, y and z coordinates) within a particular region of interest.

For example, in some embodiments, the sensors are configured to measure (e.g., detect and record) one or more variables of motion (e.g., motion within x, y and z coordinates, the rate of the motion within such coordinates, and the length of time for such motion within the x, y and z coordinates) related to a rotational body movement (e.g., rotational head movement, rotational limb movement, rotational torso movement, rotational leg movement, rotational movement resulting from respiration, etc). In some embodiments, such measured variables of motion related to a rotational body movement are transmitted (e.g., wirelessly) to a processor (e.g., a processor with an algorithm for correcting motion related imaging artifacts).

In some embodiments, the motion detecting device is configured to store all of the data associated with the measuring of one or more variables of motion associated with a PET or SPECT imaging).

In some embodiments, the motion detecting device is configured such that it can be easily positioned near a region of interest (e.g., a region to be imaged with PET or SPECT). For example, in some embodiments, the motion detecting device is configured such that it can be wrapped around a region of interest (e.g., the head of a subject to be imaged with PET or SPECT) (e.g., the arm, leg, ankle, torso of a subject to be imaged with PET or SPECT). In some embodiments, the motion detecting device is configured such that it can be wrapped around a region of interest and securely positioned at that location without itself moving (e.g., via Velcro attachment). In some embodiments, the motion detecting device is configured such that it can be wrapped around a region of interest and securely positioned at that location without itself moving (e.g., via Velcro attachment) for the entire duration of the imaging scan (e.g., PET or SPECT) (e.g., any duration of image data acquisition (e.g., 1 minute, 10 minutes, 15 minutes, 25 minutes, 30 minutes, 40 minutes, 45 minutes, 46 minutes, 50 minutes, 60 minutes, 80 minutes, 100 minutes, 300 minutes, 3000 minutes, etc.). In some embodiments, the motion detecting device is a strap of any desired length or shape having one or more sensors positioned within the strap and a means for wirelessly transmitting motion data obtained with such sensors. There are no limitations as to the size and/or shape of the motion detecting device. In some embodiments, the size and/or shape of the motion detecting device is sufficient to measure motion within a particular region of interest. In some embodiments, the motion detecting device is configured in the shape of audio "headphones" for purposes of securing it with a user's head region. In some embodiments, the size and/or shape of the motion detecting device is sufficient to measure motion within a particular region of interest without interfering with the imaging scan (e.g., PET or SPECT). In some embodiments, the motion detection devices are battery operated. In some embodiments, the motion detection devices can be charged and recharged. In some embodiments, the motion detection devices have limited metal so as to avoid attenuation artifacts (PET and SPECT), streak artifacts (CT), and/or susceptibility artifact (MRI).

In some embodiments, the one or more sensors are gyroscopes. Gyroscopes measure the angular rate of rotation about one or more axes. Gyroscopes can measure complex motions accurately in free space, hence, making it a required motion sensor for tracking the position and rotation of a moving object. Gyroscopes are not dependent on any external forces such as gravity or magnetic fields, and can therefore function fairly autonomously.

In some embodiments, the one or more sensors are accelerometers. Accelerometers measure linear acceleration and tilt angle. Single and multi-axis accelerometers detect the combined magnitude and direction of linear and gravitational acceleration. Accelerometers can be used to provide limited motion sensing functionality. For example, a motion detection device with an accelerometer can detect movement from a vertical to horizontal state in a fixed location.

In some embodiments, the motion detection device comprises one or more gyroscopes and one or more accelerometers.

The methods are not limited to particular manner of obtaining an image data set of the region of interest. In some embodiments, any form of imaging that is prone to motion related image artifacts is appropriate (e.g., any form of nuclear imaging).

In some embodiments, positron emission tomography (PET) is used to obtain an image data set for the region of interest. PET is the study and visualization of human physiology by electronic detection of short-lived positron emitting radiopharmaceuticals. It is a non-invasive technology that quantitatively measures metabolic, biochemical and functional activity in living tissue. The PET scan is a vital method of measuring body function and guiding disease treatment. It assesses changes in the function, circulation and metabolism of body organs. Unlike MRI (Magnetic Resonance Imaging) or CT (Computed Tomography) scans which primarily provide images of organ anatomy, PET measures chemical changes that occur before visible signs of disease are present on CT and MRI images. PET visualizes behaviors of trace substances within a subject (e.g., a living body) having a radioimaging agent administered therein by detecting a pair of photons occurring as an electron/positron pair annihilation and traveling in directions opposite from each other (see, e.g., U.S. Pat. No. 6,674,083).

In some embodiments, single photon emission computed tomography (SPECT) is used to obtain an image data set for the region of interest. SPECT is a tomographic nuclear imaging technique producing cross-sectional images from gamma ray emitting radiopharmaceuticals (single photon emitters or positron emitters). SPECT is routinely used in clinical studies. SPECT is performed by using a gamma camera, comprising a collimator fixed on a gamma detector, which gamma camera follows a revolution orbit around the patient's body. The gamma rays, emitted by a radioactive tracer, accumulated in certain tissues or organs of the patient's body, are sorted by the collimator and recorded by the gamma detector under various angles around the body, the collimator always pointing to (facing) the rotation axis of the camera. From the acquired planar images the distribution of the activity inside the patient's body can be computed using certain reconstruction algorithms.

An overview of SPECT, PET systems, their combination with computer tomography (CT) systems as well as iterative image reconstruction for emission tomography is given in chapter 7, chapter 11, and chapter 21 of M. Wernick and J. Aarsvold, "Emission tomography: the fundamentals of PET and SPECT," Elsevier Academic Press, 2004.

The methods are not limited to a particular manner of simultaneously obtaining an image data set of the region of interest and a motion data set at the region of interest with the motion detecting device. In some embodiments, following positioning of a motion detection device at or near the region of interest to be imaged, an image data set (e.g., with SPECT or PET) and a motion data set (e.g., with the motion detection device) are simultaneously obtained.

The methods are not limited to use of a particular algorithm for correcting motion related imaging artifacts. In some embodiments, the algorithm is configured to receive obtained image data set (e.g., with SPECT or PET) and motion data set (e.g., with the motion detection device) and identify time periods of motion from the motion data set. In some embodiments, the algorithm is further configured to correlate the identified time periods of motion with the image data set. In some embodiments, the algorithm is further configured to correlate the identified time periods of motion (e.g., time stamped measured motion) with the image data set (e.g., time stamped image data). In some embodiments, following such correlation, the algorithm is further configured to correct the image data set corresponding to the identified time periods of motion. The algorithm is not limited to a particular manner of correcting the image data set corresponding to the identified time periods of motion. In some embodiments, such correcting occurs through detecting differences between the specific coordinates (e.g., x, y and z coordinates) for the image data set and the motion data set for an identified time period of motion, and based upon such detected differences, spatially repositioning the motion related differences between the specific coordinates (e.g., x, y and z coordinates) (e.g., point by point data correction for each x, y and z coordinate). In some embodiments, following such spatially repositioning of the motion related differences between the specific coordinates (e.g., x, y and z coordinates), a reconstructed image corresponding to the identified time periods of motion is generated. In some embodiments, such a reconstructed image corresponding to the identified time periods of motion can be generated within any desired time range (e.g., within 1 second, 10 seconds, 1 minute, 2 minutes, 5 minutes, 10 minutes, 30 minutes, 1 hour, 10 hours, etc.).

The methods are not limited to a particular manner of correcting an image data set corresponding to an identified time periods of motion. In some embodiments, the algorithm receives (e.g., via wireless transmission or non-wireless transmission) the simultaneously obtained image data set (e.g., with SPECT or PET) and motion data set (e.g., with the motion detection device). Next, in some embodiments, the algorithm identifies time periods of motion from the motion data set. In some embodiments, the algorithm next correlates identified time periods of motion with the image data set. In some embodiments, the algorithm next corrects the image data set corresponding to the identified time periods of motion (e.g., through detecting differences between the specific coordinates (e.g., x, y and z coordinates) for the image data set and the motion data set for an identified time period of motion). In some embodiments, the algorithm next spatially repositions the motion related differences between the specific coordinates (e.g., x, y and z coordinates). In some embodiments, following such spatially repositioning of the motion related differences between the specific coordinates (e.g., x, y and z coordinates), the algorithm next reconstructs an image corresponding to the identified time periods of motion is generated.

Such methods of the present invention are not limited to particular uses. In some embodiments, the methods are used for imaging (e.g., PET or SPECT) any desired biological activity (e.g., any biological change and/or difference detectable by nuclear imaging) (e.g., tumor presence, tumor growth, change in tumor presence and/or growth) (e.g., tissue presence and/or growth, change in tissue growth and/or presence) (e.g., any anatomical change or difference from an established norm) within a within a subject's body region correlated with motion (e.g., brain activity, respiration activity, etc.). In some embodiments, such methods are used for detecting the presence or absence of a disorder within such body region. In some embodiments, such methods are used for assessing a subject's risk profile for developing a condition and/or disorder within such body region.

In some embodiments, the present invention provides systems for performing motion artifact correction. For example, in some embodiments, a motion detection detecting device configured to detect motion at a region of interest on an object (as described above) and an algorithm (as described above) are provided. In some embodiments, an imaging apparatus (e.g., PET or SPECT) is further provided.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the medical sciences are intended to be within the scope of the following claims.

We claim:

1. A method for correcting a motion related imaging artifact within an image, comprising
providing
1) a motion detection device configured generate a motion data set of motion at a region of interest for an object, wherein the motion data set comprises x, y and z coordinate information pertaining to the region of interest for the object, and
2) an algorithm configured to
a) receive a simultaneously obtained motion data set and image data set for a region of interest of an object, wherein the image data sets are obtained with positron emission tomography (PET) or single, photon emission computed tomography (SPECT) imaging,
b) identify any time periods of motion from the motion data set,
c) detect a motion related imaging artifact within the image data set through detecting differences between the x, y and z coordinates for the image data set and the motion data set for the identified time periods of motion,
d) correcting the detected motion related imaging artifact through spatially correcting the detected x, y and z coordinate differences for identified time periods of motion, and
positioning the motion detection device at a region of interest on an object,
simultaneously obtaining an image data set of the region of interest with PET or SPECT and a motion data set of the region of interest with the motion detecting device,
inputting the simultaneously obtained image data set and motion data set in the algorithm, and
correcting any detected motion related imaging artifacts with the algorithm.

2. The method of claim 1, further comprising the following post correcting step: generating a reconstructed image.

3. The method of claim 1, wherein the object is a subject.

4. The method of claim 3, wherein the region of interest is a portion of the subject.

5. The method of claim 1,
wherein the motion detection device comprises one or more motion detection sensors,
wherein the one or more motion detection sensors include one or more gyroscopes and/or accelerometers.

6. The method of claim 1, wherein the motion detection device is configured to be securely positioned onto or around the region of interest for the object.

7. The method of claim 1, wherein the motion data set comprising x, y and z coordinate information pertaining to the region of interest for the object comprises one or more of degree of motion within the x, y and z coordinates, rate of the motion within the x, y and z coordinates, and length of time for the detected and recorded motion within the x, y and z coordinates.

8. The method of claim 7,
wherein the degree of motion within the x, y and z coordinates comprises detecting at least 0.015 radians of motion,
wherein the rate of the motion within the x, y and z coordinates comprises detecting rates of motion greater than at least 25 Hz.

9. A method for imaging a desired anatomical region within a subject at risk for detectable motion, comprising
providing
1) a motion detection device configured generate a motion data set of motion at a desired anatomical region within a subject, wherein the motion data set comprises x, y and z coordinate information pertaining to the desired anatomical region within a subject, and
2) an algorithm configured to
a) receive a simultaneously obtained motion data set and image data set for desired anatomical region within a subject, wherein the image data sets are obtained with positron emission tomography (PET) or single, photon emission computed tomography (SPECT) imaging,
b) identify any time periods of motion from the motion data set,
c) detect a motion related imaging artifact within the image data set through detecting differences between the x, y and z coordinates for the image data set and the motion data set for the identified time periods of motion,
d) correcting the detected motion related imaging artifact through spatially correcting the detected x, y and z coordinate differences for identified time periods of motion, and positioning the motion detection device at a desired anatomical region within a subject, simultaneously obtaining an image data set of the desired anatomical region with PET or SPECT and a motion data set of the desired anatomical region with the motion detecting device, inputting the simultaneously obtained image data set and motion data set in the algorithm, and correcting any detected motion related imaging artifacts with the algorithm.

10. The method of claim 9, further comprising the following post correcting step: generating a reconstructed image.

11. The method of claim 9, wherein the subject is a living subject.

12. The method of claim 9, wherein the subject is a human subject.

13. The method of claim 12, wherein the desired anatomical region is the brain.

14. The method of claim 9,
wherein the motion detection device comprises one or more motion detection sensors,
wherein the one or more motion detection sensors include one or more gyroscopes and/or accelerometers.

15. The method of claim 9, wherein the motion detection device is configured to be securely positioned onto or around the region of interest for the object.

16. The method of claim 9, wherein the motion data set comprising x, y and z coordinate information pertaining to the desired anatomical region within a subject comprises one or more of degree of motion within the x, y and z coordinates, rate of the motion within the x, y and z coordinates, and length of time for the detected and recorded motion within the x, y and z coordinates.

17. The method of claim 16,
wherein the degree of motion within the x, y and z coordinates comprises detecting at least 0.015 radians of motion,
wherein the rate of the motion within the x, y and z coordinates comprises detecting rates of motion greater than at least 25 Hz.

18. A system for correcting a motion related imaging artifact within an image, comprising providing
1) a motion detection device configured generate a motion data set of motion at a region of interest for an object, wherein the motion data set comprises x, y and z coordinate information pertaining to the region of interest for the object, and
2) an algorithm configured to
   a) receive a simultaneously obtained motion data set and image data set for a region of interest of an object, wherein the image data sets are obtained with positron emission tomography (PET) or single, photon emission computed tomography (SPECT) imaging,
   b) identify any time periods of motion from the motion data set,
   c) detect a motion related imaging artifact within the image data set through detecting differences between the x, y and z coordinates for the image data set and the motion data set for the identified time periods of motion, and
   d) correcting the detected motion related imaging artifact through spatially correcting the detected x, y and z coordinate differences for identified time periods of motion.

19. The system of claim 18, wherein the motion data set comprising x, y and z coordinate information pertaining to the region of interest for the object comprises one or more of degree of motion within the x, y and z coordinates, rate of the motion within the x, y and z coordinates, and length of time for the detected and recorded motion within the x, y and z coordinates.

20. The system of claim 19,
wherein the degree of motion within the x, y and z coordinates comprises detecting at least 0.015 radians of motion,
wherein the rate of the motion within the x, y and z coordinates comprises detecting rates of motion greater than at least 25 Hz.

* * * * *